United States Patent
Sabate et al.

(10) Patent No.: US 6,400,584 B1
(45) Date of Patent: Jun. 4, 2002

(54) TWO STAGE SWITCHING POWER SUPPLY FOR CONNECTING AN AC POWER SOURCE TO A LOAD

(75) Inventors: Juan A. Sabate, Saratoga Springs; Gert W. Bruning, Sleepy Hollow, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/815,692

(22) Filed: Mar. 23, 2001

(51) Int. Cl.[7] .................. H02M 3/335; H02M 7/68; H02H 7/122
(52) U.S. Cl. .................. 363/22; 363/56.02; 363/98; 363/17
(58) Field of Search ............... 363/22, 17, 23, 363/56.02, 56.06, 98, 133, 19

(56) References Cited

U.S. PATENT DOCUMENTS

| | | | | |
|---|---|---|---|---|
| 4,939,427 A | * | 7/1990 | Nilssen | 315/209 R |
| 5,559,395 A | * | 9/1996 | Venkitasubrahmanian et al. | 315/247 |
| 5,570,276 A | | 10/1996 | Cuk et al. | 363/16 |
| 5,583,402 A | * | 12/1996 | Moisin et al. | 315/307 |
| 6,108,219 A | * | 8/2000 | French | 363/22 |
| 6,137,239 A | * | 10/2000 | Wu et al. | 315/291 |
| 6,147,457 A | * | 11/2000 | Lohn et al. | 315/209 R |

FOREIGN PATENT DOCUMENTS

EP 0336725 A2 11/1989 .......... H02M/3/335

* cited by examiner

Primary Examiner—Bao Q. Vu

(57) ABSTRACT

A switching power supply is provided in two stages with the primary of the power transformer being in the first stage and the secondary in the second stage. The first stage includes an EMI filter connected to the input of a rectifier. The output of the rectifier is connected to a self oscillating, half-bridge, resonant inverter operating in open loop with the primary of the transformer to provide isolation from the power source. Feed-forward control is used to compensate for line variations, providing very small output voltage variation compared with input voltage variation. In the second stage, the secondary of the transformer provides an input to post regulator circuitry including a PWM control circuit to regulate the output current using the error signal representing the differences between the current sensed and the desired value.

20 Claims, 6 Drawing Sheets

TWO STAGE SWITCHING POWER SUPPLY FOR CONNECTING AN AC POWER SOURCE TO A LOAD

TECHNICAL FIELD

This invention relates generally to switching power supplies and, more particularly, to two-stage switching converters with transformer separation. One area in which the invention finds particular utility is in connection with high end battery chargers.

BACKGROUND TECHNOLOGY

The increasing demand for size reduction of virtually all electronic appliances is difficult to meet with presently available switching power supplies. Several features inherent in devices of relevant technology militate against achievement of the desired goal. For example, the whole converter must typically be designed to handle a relatively wide range of input voltage, resulting in low efficiency. Moreover, reducing the size of magnetic and filtering elements require high switching frequencies, with concomitant high converter losses. High losses are inherent for high frequency operation due to the necessity of dissipating the energy stored in the leakage inductance of the transformer to avoid large voltage spikes across the main transistor. Also, implementation of isolation of the feedback signal is costly and bulky, and the whole converter has to be redesigned if there are changes in the load voltage requirements.

Switching power supplies presently employed in high end battery chargers typically use a single stage off-line converter, most commonly a flyback converter. Rectified and filtered line voltage is applied to the converter which provides isolation from the mains and regulates the output voltage. To regulate the charging current, the converter needs a feedback signal from the output. The feedback is normally provided by an optocoupler which passes the signal to the control providing isolation. A typical circuit is depicted in FIG. 1. The present invention is directed to overcoming one or more of the problems or disadvantages associated with the present state of the art.

SUMMARY OF THE INVENTION

The present invention, in the embodiments described hereinafter, offers the following features and advantages:

1. Compensation for variations in input voltage is effected in two different stages of the circuit, permitting design of each part for a smaller regulation range, resulting in more efficient circuits.

2. The reduced regulation range in each stage also results in reduced voltage and current stress in the components, permitting the use of lower cost components to provide the same performance.

3. Changes in load voltage requirements can be accommodated with redesign of only the second stage.

4. Output regulation is performed in the second stage, which is isolated from the mains, whereby no isolation of the feedback signal is required.

5. Efficiency is further enhanced by utilizing the secondary converters as a synchronous rectifier with less losses of the diode used in conventional relevant technology.

6. The first stage, in a preferred embodiment, is a half-bridge, resonant, self-oscillating circuit, operating with zero voltage switching (ZVS) with much lower switching losses, recovery of the leakage energy, and clamping of the voltage of the switches to the voltage after the line rectifier.

BEST MODE FOR CARRYING OUT THE INVENTION

Figure 1:
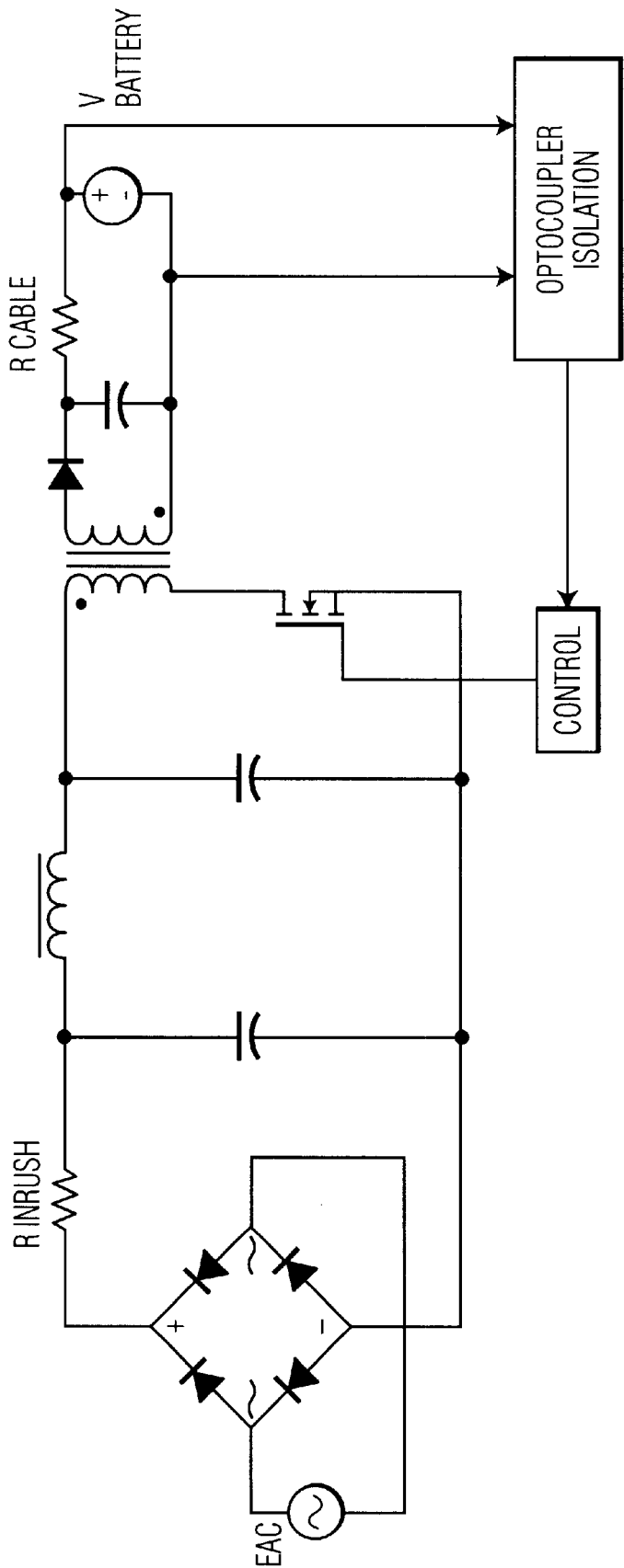
FIG. 1, as previously mentioned, is a schematic of a typical switching power supply presently used in high end battery chargers.
Figure 2:
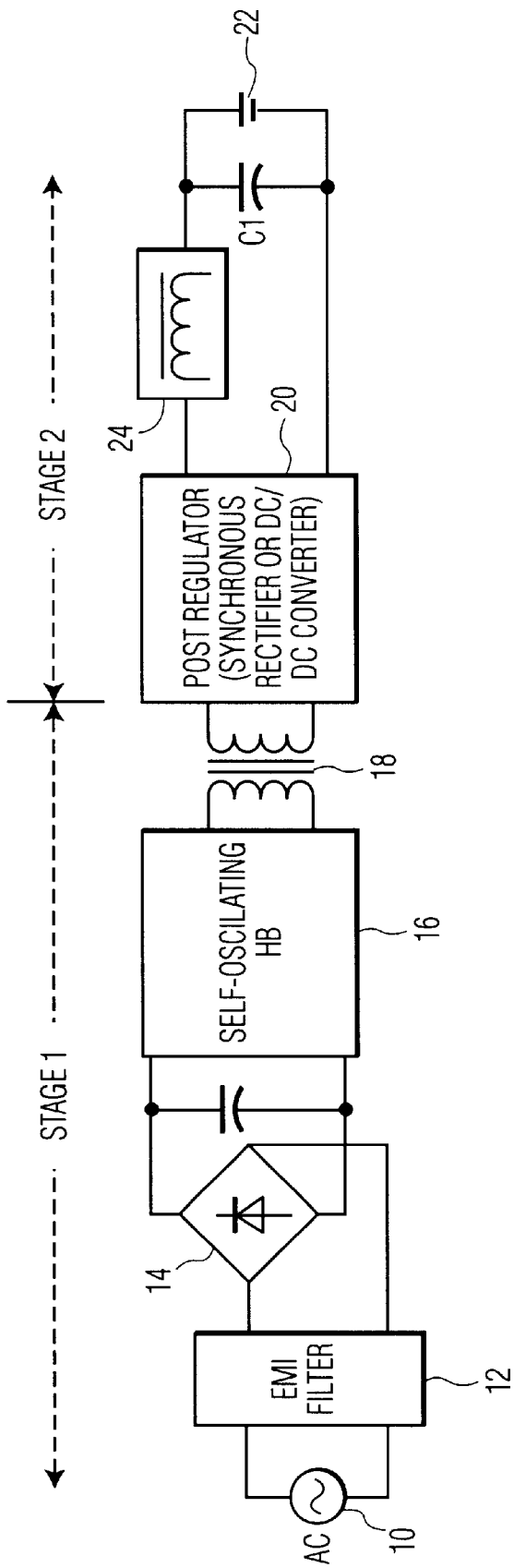
FIG. 2 is a block diagram of the present invention.

The switching power supply of the invention comprises two stages, denoted in the block diagram of FIG. 2 as Stage 1 and Stage 2. In Stage 1, power supplied from a conventional AC power source 10 is delivered through a common EMI (electromagnetic interference) filter represented by box 12. Filter 12 is connected to rectifier 14, the output of which is connected to a self oscillating, half-bridge, resonant inverter 16 operating in open loop with transformer 18 in the output to provide isolation from power source 10. Feed-forward control is used, as disclosed later in more detail, to compensate for line variations. The feed-forward control will provide very small output voltage variation compared with input voltage variation. In Stage 2, the secondary of transformer 18 provides an input to post regulator circuitry 20, a preferred embodiment of which is discussed hereinafter, the output of which is connected across load 22, depicted as a battery receiving a charge from the switching power supply of the invention. Regulator 20 is connected to the positive side of load 22 through an additional winding of the transformer, indicated by box 24, and capacitor C1 is connected in parallel with load 22.

Figure 3:
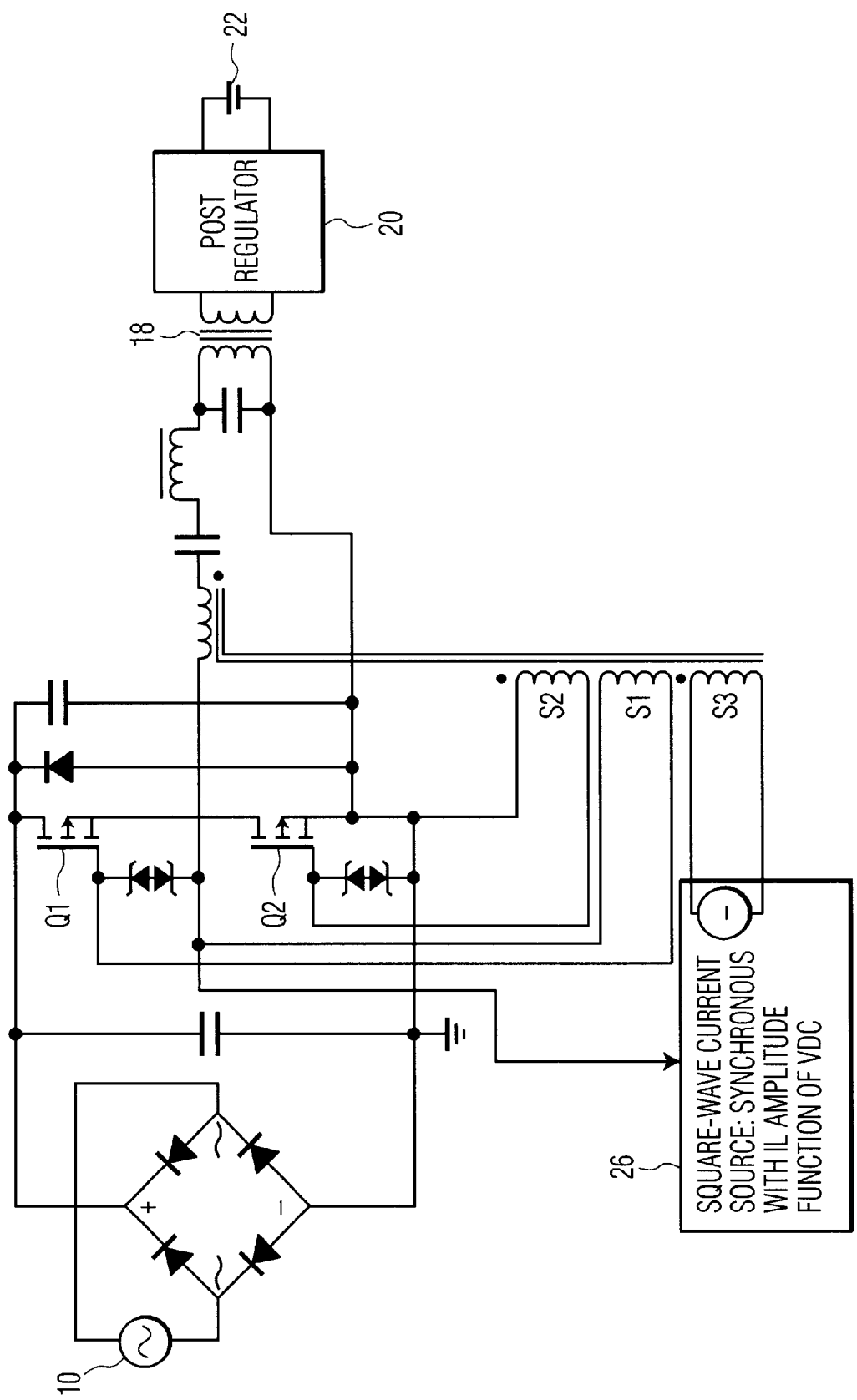
FIG. 3 is an electrical schematic of a preferred embodiment of a portion of the first stage of block diagram of FIG. 2.

A preferred embodiment of portions of Stage 1 is depicted in the schematic diagram of FIG. 3. Half bridge 16 includes a pair of solid state switching devices, shown in FIG. 3 in the form of MOSFETs Q1 and Q2, operating in a complementary manner. The circuit self-oscillation is effected by generating gate signals for MOSFETs Q1 and Q2 utilizing a square wave current source 26. The sinusoidal inductor current is sensed with a current transformer with three secondaries S1, S2 and S3. Secondaries S1 and S2 drive the gates of power MOSFETs Q1 and Q2, respectively, and the third secondary S3 supplies the control signal to current source 26.

Figure 4:
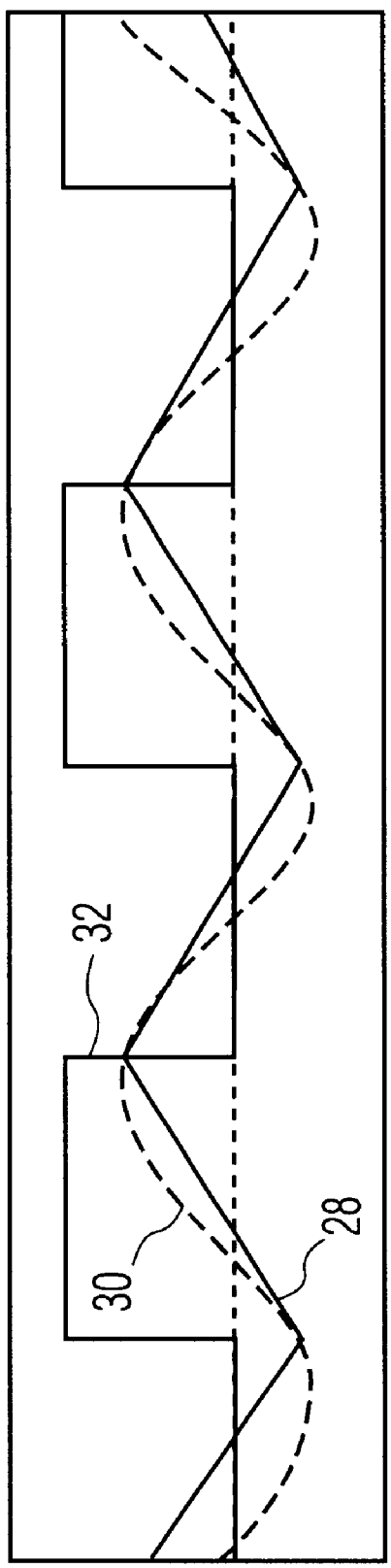
FIG. 4 is a graphical representation of voltage and current waveforms associated with operation of the invention.

Operating without regulation, the change of polarity of the gate voltage for MOSFETs Q1 and Q2 occurs when the magnetizing current, indicated in FIG. 4 by triangular wave 28, is equal to the resonant inductor current, indicated by sinusoidal wave 30. Thus, the voltage supplied by the half bridge is the square wave denoted by reference numeral 32. The conditions for oscillation are described in "Self-Oscillating Electronic Ballast Analysis via Relay Systems Approach," C. Chang and G. Bruning, APEC 1999 and "Analysis of the Self-Oscillating Series Resonant Inverter for Electronic Ballasts," C. Chang and G. Bruning, IEEE Transactions On Power Electronics, vol. 14, no. May 3, 1999, pp. 533–540.

Figure 5:
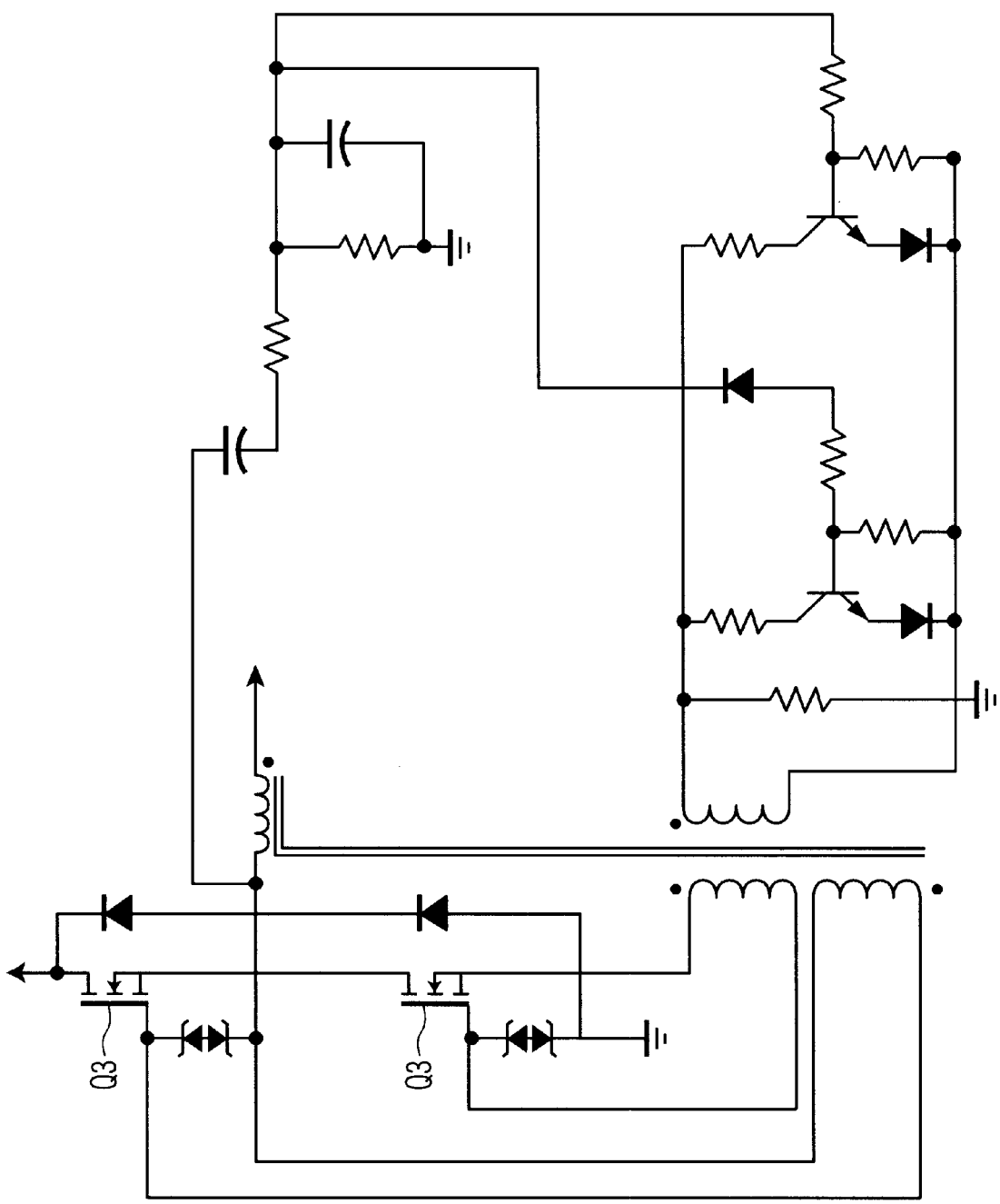
FIG. 5 is an electrical schematic of a preferred embodiment of another portion of the first stage of the circuit.

FIG. 5 is an electrical schematic of a preferred embodiment of the current source to generate the current applied to the control winding of the current transformer. The generated current is a triangular waveform synchronous with the resonant current and has an amplitude proportional to the input voltage. A simple RC filter converts the square waveform of the voltage at the mid-point of the half bridge to a triangular waveform without DC component. The amplitude of the waveform is proportional to the input voltage. The generated triangular waveform is used to drive the base of a bipolar transistor to generate a proportional current. Since the bipolar transistor is a unidirectional device, one transistor is required for the positive part of the waveform and another for the negative part. Some distortion is expected around the crossover point, but it has no significant effect on circuit operation because the phase shift between current and voltage at the input of the resonant tank is controlled by the value of the peak current. The waveforms look the same as in FIG. 4, but in this case the triangular waveform is generated from the bridge voltage and its amplitude is proportional to the input voltage.

Figure 6:
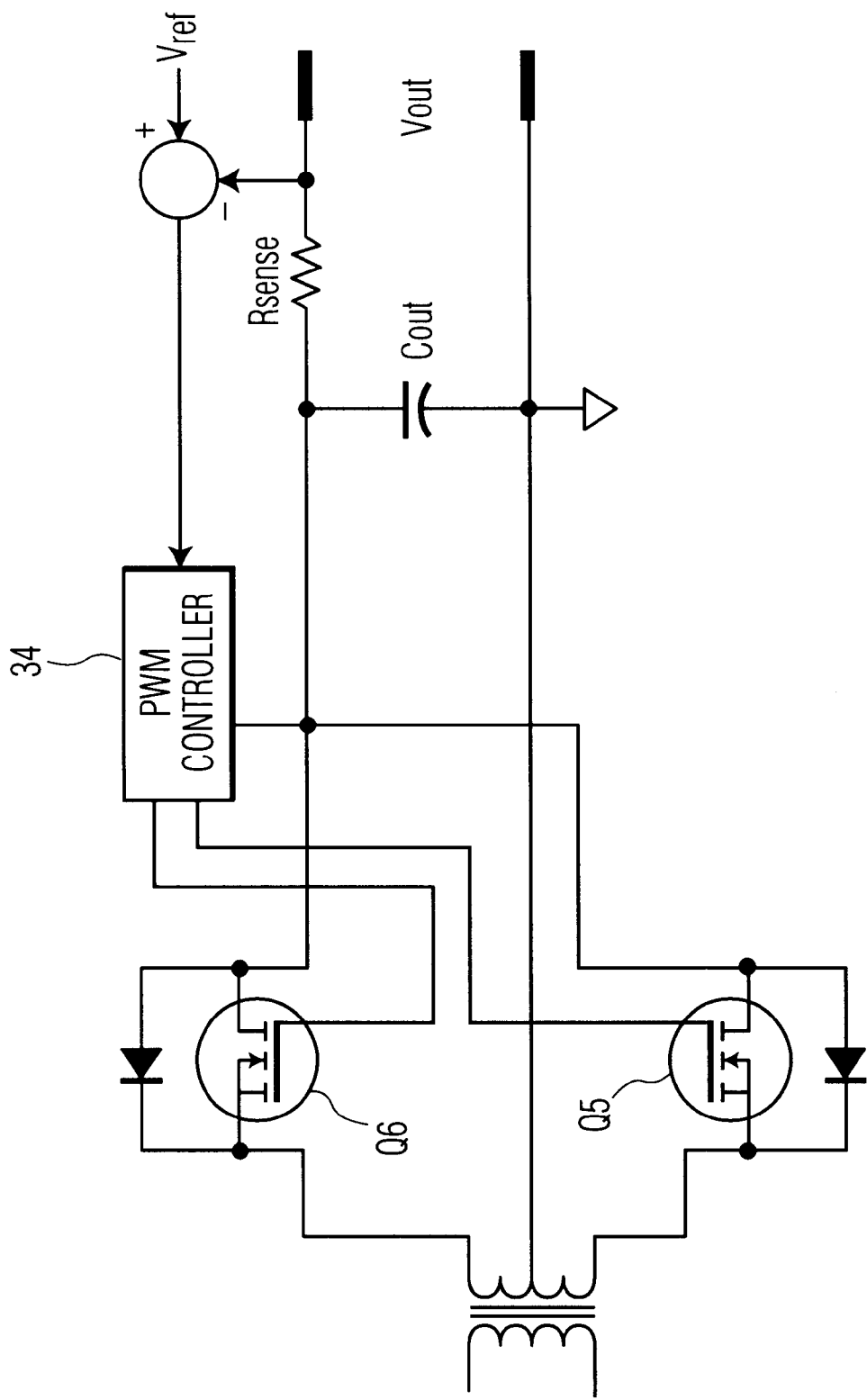
FIG. 6 is an electrical schematic of a preferred embodiment of the second stage of the circuit of the invention.

The preferred embodiment of Stage 2, a converter which uses the voltage at the secondary of the power transformer of the inverter stage, is shown in FIG. 6. A conventional full wave rectifier, or a version with synchronous rectifiers, cannot provide control of the current delivered to the load. The two MOSFETs Q5 and Q6 act synchronous rectifiers, but their orientation ensures that the internal body diodes will not conduct when the channel is turned off. The conduction time can be controlled to regulate the average output current. PWM control circuit 34 provides control of the gate voltages to regulate the output current using the error signal representing the difference between the current sensed and the desired value.

Functional Description

From the foregoing, it will be appreciated that the invention provides a novel and improved switching power supply operating in two stages. The first stage comprises a self oscillating, half-bridge, resonant inverter operating in open loop with a transformer in the output to provide isolation from the utility line. Feed-forward control is used to compensate for line variations. The feed-forward control will provide very small output voltage variations relative to input voltage variation. The second stage comprises a converter for load regulation which can be optimized for a very small input voltage variation because the input voltage variation is already eliminated, or at least greatly reduced by the operation of the inverter. This is very advantageous in terms of size reduction and efficiency, particularly for universal input line chargers.

It is important to note that each of the two stages can be used independently for different applications. For example, the disclosed embodiment of the inverter of Stage 1 could be used to drive a lamp in a ballast application as well as for driving the post-regulator disclosed for battery charging. In the disclosed system the limited input range permits the magnetics and filtering elements of the post-regulators to be optimized for cost and size improvements. Isolation of the feedback signal is no longer needed because the converter providing the output regulation does not need to be isolated. Moreover, the proposed system allows modularity of design. That is, different load regulation converters in the secondary can be used with the same self-oscillating half bridge and transformer, eliminating the need to redesign the entire converter. Also, more than one module could be used if several output are required. It should also be noted that power source 10 need not necessarily be an AC source, but may be a solar or other DC source.

Other aspects and features of the present invention can be obtained from a study of the drawings, the disclosure, and the appended claims.

What is claimed is:

1. A two-stage switching power supply for connecting an AC power source to a load, said power supply comprising:
   a) a first stage including:
      i) a rectifier receiving power from said AC source and having an output;
      ii) a self oscillating, half-bridge, resonant inverter connected to said rectifier output; and
      iii) the primary side of a transformer, said inverter operating in open loop with said primary side to provide isolation from said AC source; and
   b) a second stage including:
      i) the secondary side of said transformer; and
      ii) post regulator circuitry connected to said secondary side and having an output connected across said load.

2. The switching power supply of claim 1 wherein said load is a battery receiving a charge from said AC source through said power supply.

3. The switching power supply of claim 1 wherein said first stage further comprises an EMI filter having an input connected to said AC source and an output connected to said rectifier.

4. The switching power supply of claim 1 wherein said resonant inverter comprises a pair of solid state devices, each having a gate, and said first stage further comprises a square wave current source providing gate signals to said devices to effect self oscillation of said inverter.

5. The switching power supply of claim 4 wherein said solid state devices are MOSFETs operating in a complementary manner.

6. The switching power supply of claim 4 wherein said inverter further comprises a current transformer having first, second and third secondaries, said first and second secondaries being respectively connected to drive said gates of said devices, and said third secondary being connected to said square wave current source to provide a control signal thereto.

7. The switching power supply of claim 6 wherein said current transformer further includes a control winding and a current generating source which generates a current having a triangular waveform connected to said control winding.

8. The switching power supply of claim 7 wherein said waveform is synchronous with the resonant current and has an amplitude proportional to input voltage.

9. The switching power supply of claim 7 and further comprising an RC filter converting the square waveform of the voltage at the mid-point of said half bridge to a triangular waveform without DC component.

10. The switching power supply of claim 1 wherein said post regulator circuitry comprises a converter connected to said transformer secondary.

11. The switching power supply of claim 10 wherein said converter comprises a pair of solid state devices, each having a gate, acting as a synchronous rectifier oriented for non-conduction when the respective channel is turned off.

12. The switching power supply of claim 11 wherein said pair of devices are MOSFETs.

13. The switching power supply of claim 12 wherein said second stage further comprises a PWM control circuit providing control of the gate voltages of said MOSFETs to regulate the output current using the error signal representing the differences between the current sensed and the desired value.

14. A two-stage switching power supply for connecting an AC power source to a load, said power supply comprising:

a) a first stage including:
an EMI filter having an input connected to said AC source and an output;
a rectifier having an input connected to said EMI filter output and an output;
a self oscillating, half-bridge, resonant inverter connected to said rectifier output and having first and second solid state devices, each having a gate;
a square wave current source providing gate signals to said devices to effect self oscillation of said inverter;
a current transformer having a control winding and three secondaries, two of said secondaries being respectively connected to drive said gates of said devices and the third being connected to provide a control signal to said square wave current source;
a current generating source which generates a current having a triangular waveform connected to said control winding;
the primary side of a power transformer, said inverter operating in open loop with said primary side to provide isolation from said AC source; and b) a second stage including:
the secondary side of said power transformer;
a converter connected to said secondary side and having third and fourth solid state devices acting as a synchronous rectifier oriented for non-conduction when the respective channel is turned off; and
a PWM control circuit providing control of the gate voltages of said third and fourth devices to regulate the output current using the error signal representing the differences between the current sensed and the desired value.

15. The switching power supply of claim 14 wherein said load is a battery receiving a charge from said AC source through said power supply.

16. The switching power supply of claim 14 wherein said first, second, third and fourth solid state devices are MOS-FETs.

17. A two-stage switching power supply for connecting a source of electrical power to a load, said power supply comprising:

a) a first stage including a self oscillating, half-bridge, resonant inverter connected to said power source and the primary side of a power transformer, said inverter operating in open loop with said primary side to provide isolation from said power source; and b) a second stage including the secondary side of said transformer and post regulator circuitry connected to said secondary side and having an output connected across said load.

18. The switching power supply of claim 17 wherein said power source is an AC power source and said first stage further includes a rectifier receiving power from said AC source and having an output connected to said inverter.

19. The switching power supply of claim 17 wherein feed-forward control is used in said first stage to compensate for input line variations.

20. The switching power supply of claim 17 wherein said inverter comprises a pair of solid state devices, each having a gate, and said first stage further comprises a square wave current source providing gate signals to said devices to effect self oscillation of said inverter.

* * * * *